US009742949B2

(12) United States Patent
Manabe et al.

(10) Patent No.: US 9,742,949 B2
(45) Date of Patent: Aug. 22, 2017

(54) IMAGE FORMING SYSTEM THAT REDUCES TIME AND LABOR FOR INPUTTING LICENSE-RELATED DATA TO VALIDATE OPTIONAL FUNCTION OF IMAGE FORMING APPARATUS, AND ACTIVATION METHOD

(71) Applicant: KYOCERA Document Solutions Inc., Osaka (JP)

(72) Inventors: Hiroshi Manabe, Osaka (JP); Haruhisa Sumimoto, Osaka (JP); Shinichiro Watase, Osaka (JP); Tatsuya Hiwatari, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/183,194

(22) Filed: Jun. 15, 2016

(65) Prior Publication Data

US 2016/0381243 A1 Dec. 29, 2016

(30) Foreign Application Priority Data

Jun. 23, 2015 (JP) ................................ 2015-125470

(51) Int. Cl.
*H04N 1/00* (2006.01)

(52) U.S. Cl.
CPC . *H04N 1/00962* (2013.01); *H04N 2201/0094* (2013.01)

(58) Field of Classification Search
CPC .................. H04N 1/00962; H04N 2201/0094
See application file for complete search history.

(56) References Cited

U.S. PATENT DOCUMENTS

2008/0198406 A1 8/2008 Takamune .................. 358/1.15
2008/0209569 A1* 8/2008 Araki ...................... G06F 21/44 726/26
2011/0296400 A1 12/2011 Ogura .......................... 717/174
2012/0304248 A1* 11/2012 Watts .................... G06Q 30/06 726/1

FOREIGN PATENT DOCUMENTS

JP 2008-203936 A 9/2008
JP 2011-248776 A 12/2011

* cited by examiner

*Primary Examiner* — Iriana Cruz
(74) *Attorney, Agent, or Firm* — Stein IP, LLC

(57) ABSTRACT

The information processing device includes: a display part; an operational input part; an MFP selection part for presenting to an administrator a list of MFP candidates for activation of an optional function and then accepting a selection of the MFP via the operational input part; an optional function selection part for presenting to the administrator a list of optional function candidates to be activated on the selected MFP and then accepting a selection of the optional function via the operational input part; a license key acquisition part for acquiring a license key for activation of the selected optional function; and an optional function activation part for issuing to the selected MFP an instruction for activating the selected optional function on the selected MFP.

2 Claims, 11 Drawing Sheets

DESIGNATING LICENSE KEY
LICENSE KEY
PLEASE DESIGNATE LICENSE KEY FOR TARGET DEVICE
OPTIONAL FUNCTION NAME: DATA SECURITY KIT

| DEVICE NAME | IP ADDRESS | HOST NAME | MODEL | LICENSE KEY |
|---|---|---|---|---|
| MFP_B | 192.168.0.28 | HOST_B | MODEL_B | |
| MFP_H | 192.168.0.80 | HOST_H | MODEL_B | |

G1
G2
LICENSE KEY
W2
PLEASE ENTER ACTIVATION KEY BY 20-DIGIT NUMBER
Ex.) xxxx-xxxx-xxxx-xxxx-xxxx
OK
CANCEL
IMPORT LICENSE KEY ...
ADD LICENSE KEY ...
B1
BACK
NEXT
CANCEL

FIG.2

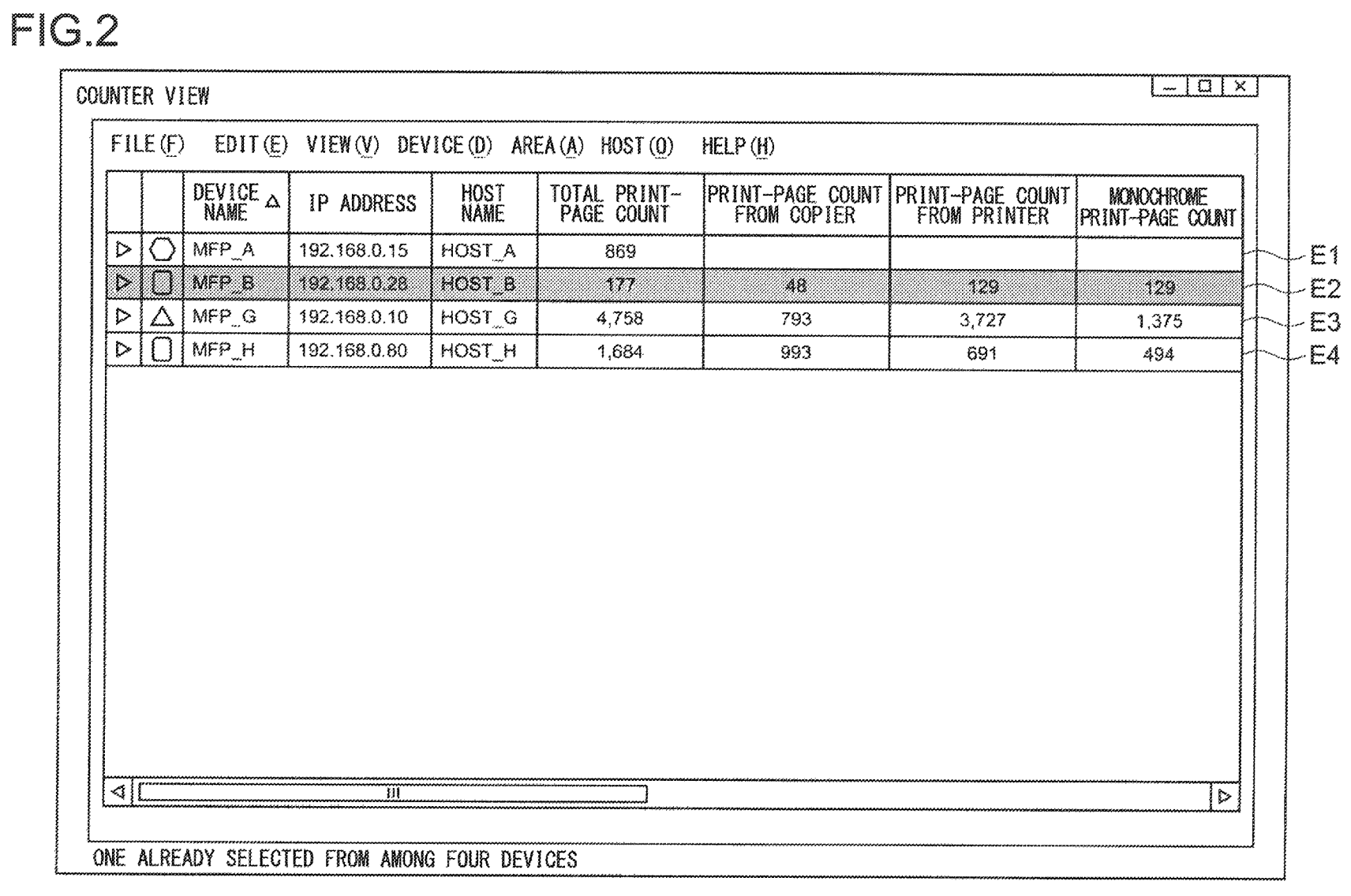

COUNTER VIEW

FILE (F) EDIT (E) VIEW (V) DEVICE (D) AREA (A) HOST (O) HELP (H)

| | | DEVICE NAME △ | IP ADDRESS | HOST NAME | TOTAL PRINT-PAGE COUNT | PRINT-PAGE COUNT FROM COPIER | PRINT-PAGE COUNT FROM PRINTER | MONOCHROME PRINT-PAGE COUNT |
|---|---|---|---|---|---|---|---|---|
| ▷ | ⬡ | MFP_A | 192.168.0.15 | HOST_A | 869 | | | |
| ▷ | ▢ | MFP_B | 192.168.0.28 | HOST_B | 177 | 48 | 129 | 129 |
| ▷ | △ | MFP_G | 192.168.0.10 | HOST_G | 4,758 | 793 | 3,727 | 1,375 |
| ▷ | ▢ | MFP_H | 192.168.0.80 | HOST_H | 1,684 | 993 | 691 | 494 |

ONE ALREADY SELECTED FROM AMONG FOUR DEVICES

DESIGNATING LICENSE KEY

LICENSE KEY
PLEASE DESIGNATE LICENSE KEY FOR TARGET DEVICE

OPTIONAL FUNCTION NAME: OCR KIT

| DEVICE NAME | IP ADDRESS | HOST NAME | MODEL | LICENSE KEY |
|---|---|---|---|---|
| MFP_B | 192.168.0.28 | HOST_B | MODEL_B | |

G1

LICENSE KEY
PLEASE ENTER ACTIVATION KEY BY 20-DIGIT NUMBER
Ex.) xxxx-xxxx-xxxx-xxxx-xxxx
OK
CANCEL

W2

ADD LICENSE KEY ...
IMPORT LICENSE KEY ...
B1

<BACK
NEXT>
CANCEL

FIG. 7

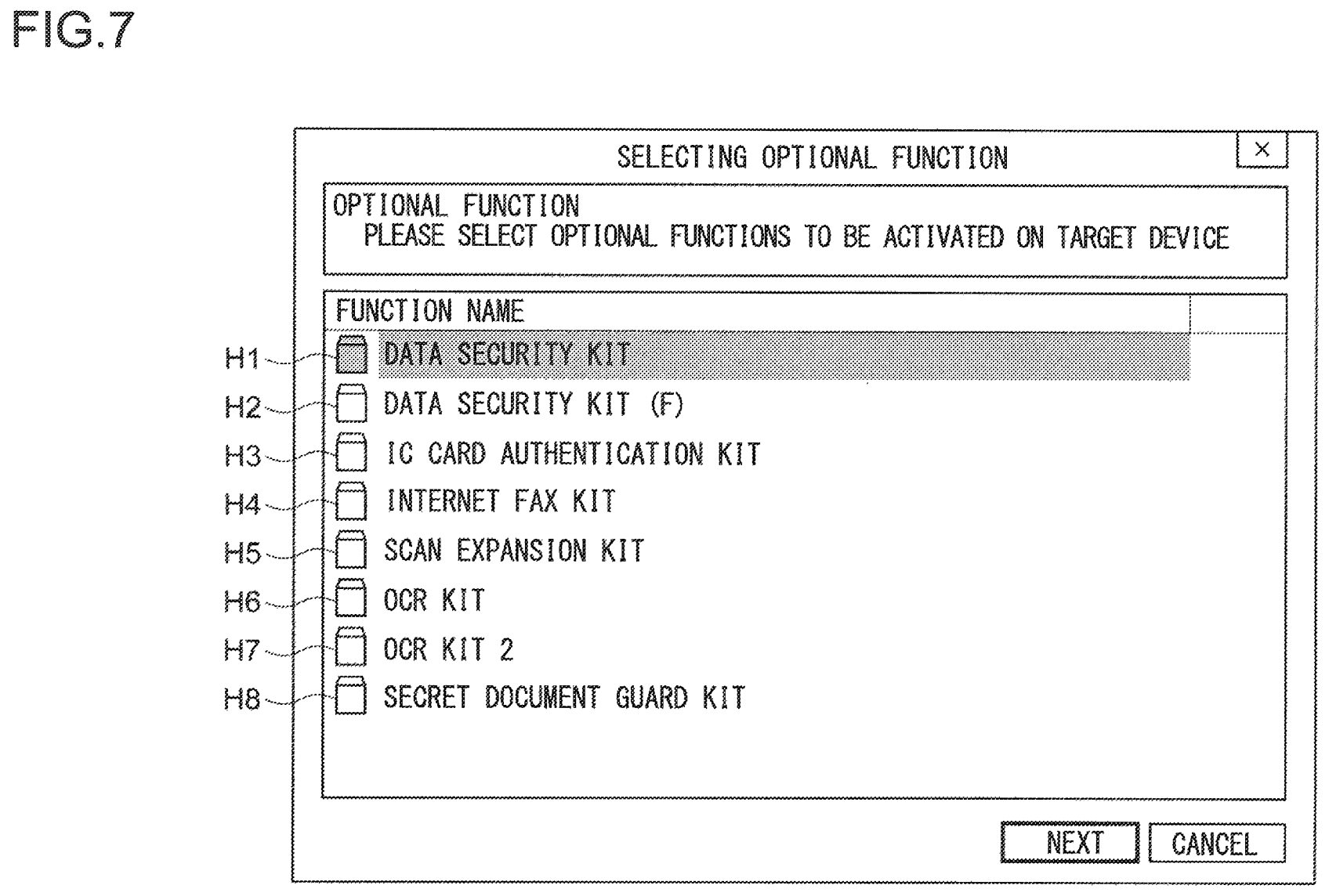

SELECTING OPTIONAL FUNCTION

OPTIONAL FUNCTION
PLEASE SELECT OPTIONAL FUNCTIONS TO BE ACTIVATED ON TARGET DEVICE

FUNCTION NAME

H1 DATA SECURITY KIT
H2 DATA SECURITY KIT (F)
H3 IC CARD AUTHENTICATION KIT
H4 INTERNET FAX KIT
H5 SCAN EXPANSION KIT
H6 OCR KIT
H7 OCR KIT 2
H8 SECRET DOCUMENT GUARD KIT

NEXT
CANCEL

FIG.9

DESIGNATING LICENSE KEY

LICENSE KEY
PLEASE DESIGNATE LICENSE KEY FOR TARGET DEVICE

OPTIONAL FUNCTION NAME: DATA SECURITY KIT

| DEVICE NAME | IP ADDRESS | HOST NAME | MODEL | LICENSE KEY |
| --- | --- | --- | --- | --- |
| MFP_B | 192.168.0.28 | HOST_B | MODEL_B | |
| MFP_H | 192.168.0.80 | HOST_H | MODEL_B | |

IMPORT LICENSE KEY ...
ADD LICENSE KEY ...
< BACK
NEXT >
CANCEL

B2

IMAGE FORMING SYSTEM THAT REDUCES TIME AND LABOR FOR INPUTTING LICENSE-RELATED DATA TO VALIDATE OPTIONAL FUNCTION OF IMAGE FORMING APPARATUS, AND ACTIVATION METHOD

INCORPORATION BY REFERENCE

This application is based upon and claims the benefit of priority from the corresponding Japanese Patent Application No. 2015-125470 filed on Jun. 23, 2015, the entire contents of which are incorporated herein by reference.

BACKGROUND

This disclosure relates to an information processing device and information processing method for activating optional functions of MFPs (Multifunction Peripherals) as well as to a nontemporary computer-readable recording medium for storing information processing programs.

In MFPs, mostly, such functions as one for enhancing treated-data security and an OCR (Optical Character Recognition) function are offered as optional functions.

Under such circumstances, various contrivances have been made to properly manage those optional functions.

For example, a technique disclosed in typical MFPs allows installed-software licenses to be transferred, without incurring a load on a user, simply from one to another among equipment devices which are administered in terms of software license by a license management system.

With another typical technique, even though optional programs or optional data are copied from an MFP in which those optional programs or optional data are offered to another MFP which has not been licensed for relevant optional functions, a license key which has been encoded in the server with data unique to the MFP and which has been given from the server cannot be decoded, so that the optional functions cannot be used in other non-licensed MFPs.

Conventionally, in order to validate and activate optional functions of an MFP, it has been necessary for the user to obtain license keys or the like by paying their fees and moreover for the user or serviceman to set the obtained license keys or the like one by one on the MFP. This has been troublesome, involving time and labor.

SUMMARY

An information processing device according to an aspect of this disclosure includes a display part, an operational input part, an image forming apparatus selection part (Multifunction Peripheral selection part), an optional function selection part, a license key acquisition part, and an optional function activation part. The image forming apparatus selection part presents to an administrator, via the display part, a list of image forming apparatus candidates for activation of an optional function and then accepting a selection of an image forming apparatus by the administrator via the operational input part. The optional function selection part presents to the administrator, via the display part, a list of optional function candidates to be activated on the selected image forming apparatus and then accepting a selection of the optional function by the administrator via the operational input part. The license key acquisition part acquires a license key for activation of the selected optional function on the selected image forming apparatus. The optional function activation part issues to the selected image forming apparatus an instruction for activating the selected optional function on the selected image forming apparatus with use of the acquired license key.

A nontemporary computer-readable recording medium for storing an information processing program according to another aspect of the disclosure, by means of the information processing program, causes the computer to function as: an image forming apparatus selection part for presenting to an administrator, via a display part, a list of image forming apparatus candidates for activation of an optional function, and then accepting a selection of an image forming apparatus by the administrator via an operational input part; an optional function selection part for presenting to the administrator, via the display part, a list of optional function candidates to be activated on the selected image forming apparatus and then accepting a selection of the optional function by the administrator via the operational input part; a license key acquisition part for acquiring a license key for activation of the selected optional function on the selected image forming apparatus; and an optional function activation part for issuing to the selected image forming apparatus an instruction for activation of the selected optional function on the selected image forming apparatus with use of the acquired license key.

This disclosure may also be an information processing method for use of the information processing device having the above-described configuration.

BRIEF DESCRIPTION OF THE DRAWINGS

FIG. 2 is a diagram illustrating an example of a screen on which an administrator operates;

FIG. 5 is a diagram illustrating an example of the screen on which the administrator operates;

FIG. 7 is a diagram illustrating an example of the screen on which the administrator operates;

FIG. 9 is a diagram illustrating an example of the screen on which the administrator operates;

DETAILED DESCRIPTION

Hereinbelow, an embodiment of this disclosure will be described with reference to the accompanying drawings.

(General Configuration)

Figure 1:
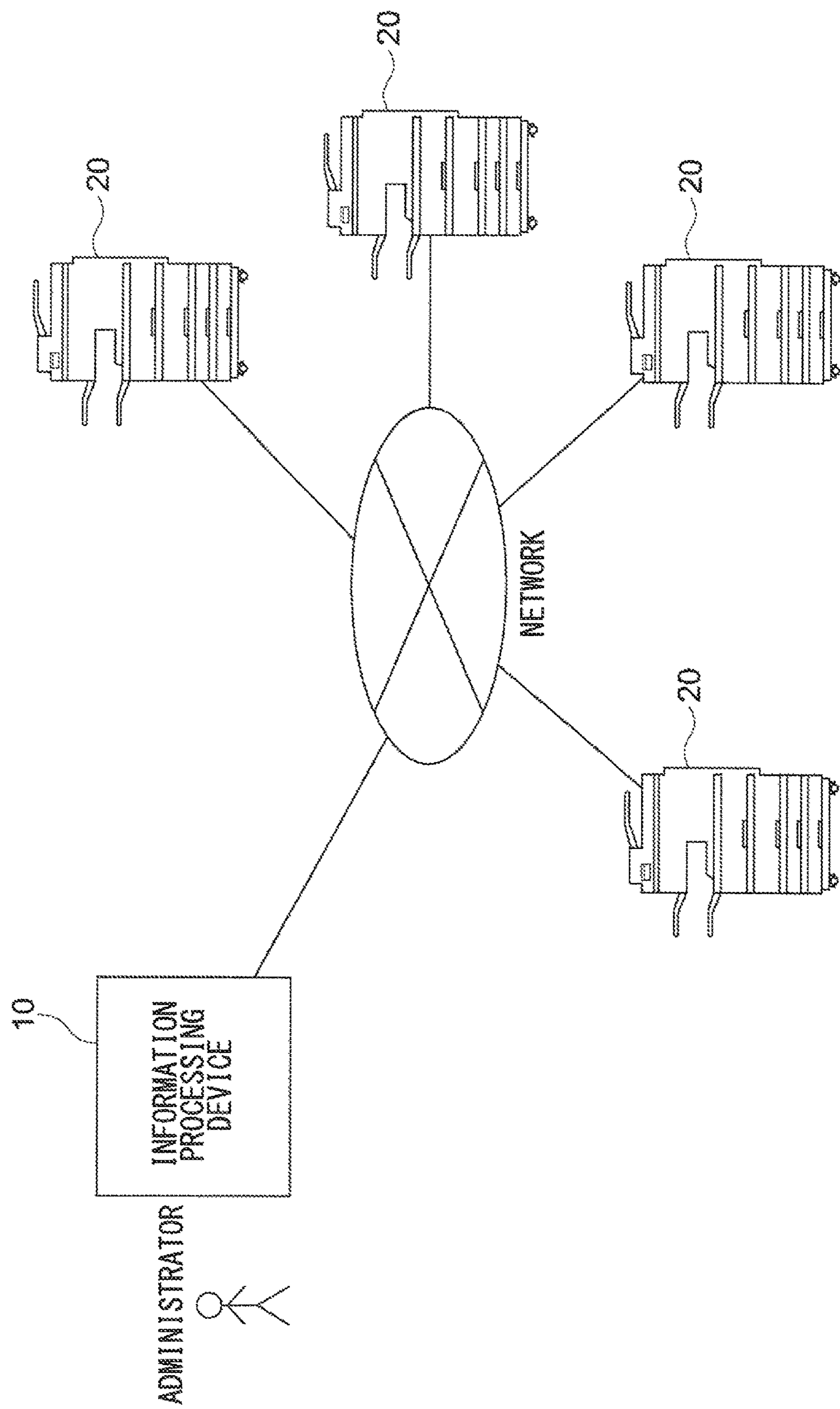
FIG. 1 is a diagram illustrating a configuration of an image forming system including an information processing device 10 according to an embodiment of this disclosure.

First, a general configuration of an environment in which the information processing device according to the embodiment of this disclosure is used will be described. FIG. 1 is a diagram illustrating a configuration of an image forming system including an information processing device 10 according to an embodiment of this disclosure.

In an environment in which the information processing device 10 and one or more MFPs 20 are connected to each other via a network, with an intention of activating an optional function provided in the MFPs 20, the administrator inputs a license key or the like to the information processing device 10, and then activation of the optional function of the MFPs 20 via the network is fulfilled.

The network may be either LAN (Local Area Network) or WAN (Wide Area Network) if only it allows the information processing device 10 and the MFPs 20 to be communicated therebetween.

This is all of the description of a general configuration of the environment in which the information processing device 10 according to the embodiment of this disclosure is used.

(Example of Operation Screen)

Next, an operation example by the administrator with the information processing device 10 will be described by using screen examples presented to the administrator. FIGS. 2 to 9 are views showing examples of the screen on which the administrator operates.

Figure 6:
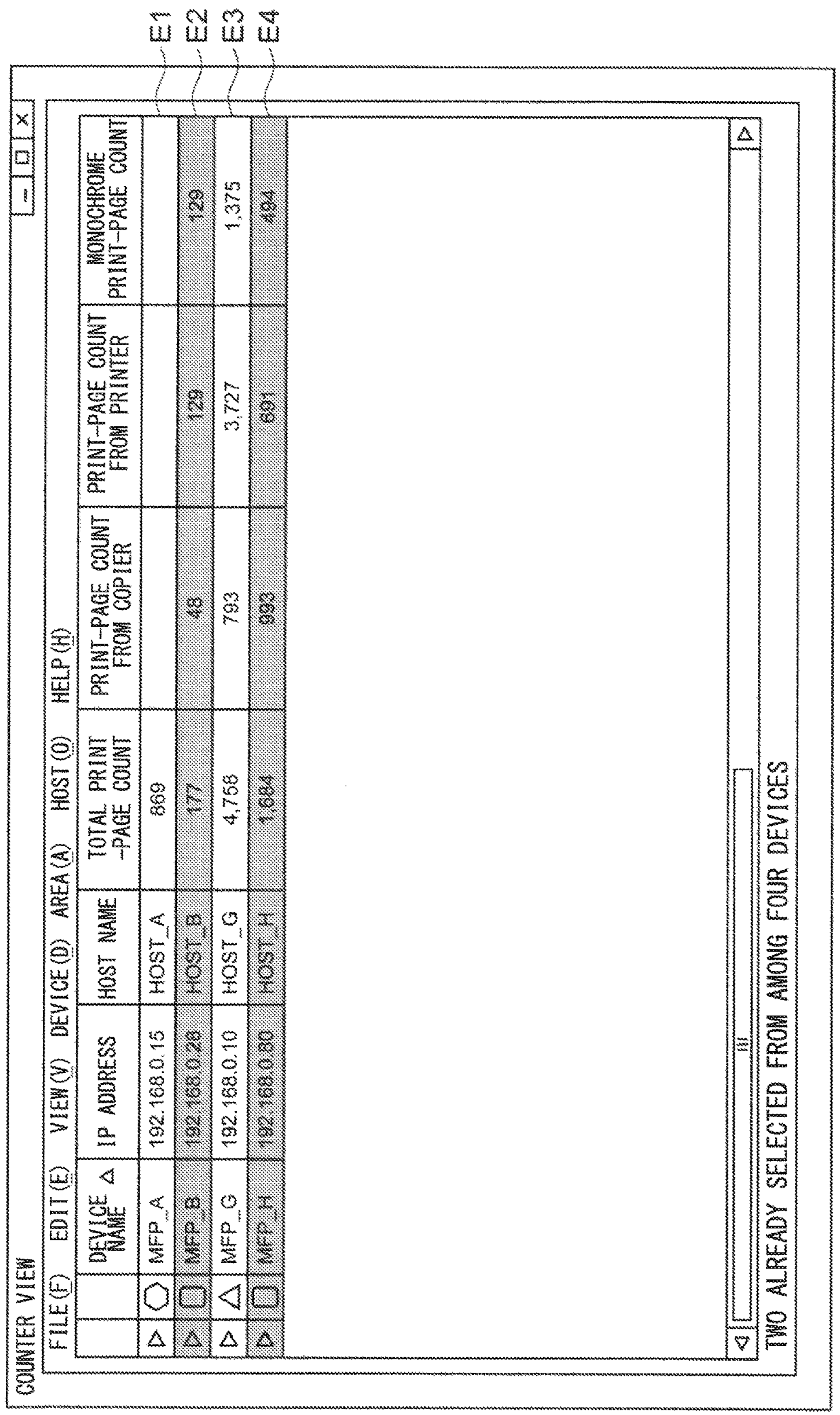
FIG. 6 is a diagram illustrating an example of the screen on which the administrator operates.
Figure 8:
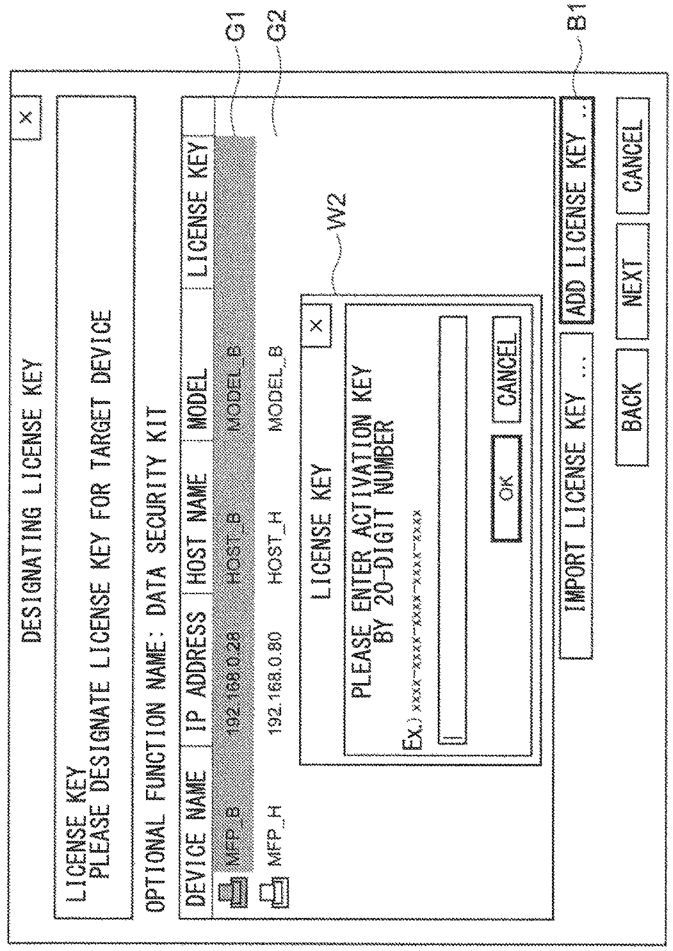
FIG. 8 is a diagram illustrating an example of the screen on which the administrator operates.

FIGS. 2 to 5 are screen examples showing operations of selecting one MFP 20 and activating an optional function. FIGS. 6 to 8 are screen examples showing operations of selecting a plurality of MFPs 20 and activating an optional function. FIG. 9 is a screen example showing an aspect in which license keys or the like are given in a CSV (Comma-Separated Values) file format after the selection of a plurality of MFPs 20.

(Example in which One MFP is Selected)

First, an example in which one MFP 20 is selected and then an optional function is selected and activated on the selected MFP 20 will be described. FIGS. 2 to 5 are screen examples showing operations of selecting one MFP 20 and activating an optional function.

FIG. 2 gives a display of a list of MFPs 20 for selection of an MFP 20 on which an optional function is to be activated. In this example, a counter view (a screen for displaying various types of counter views in the individual MFPs 20) is adopted to display a list of MFPs 20 under administration of the information processing device 10. Then, the second row (E2) in the list is highlighted by the administrator, so that the MFP 20 of device name 'MFP_B' is selected.

Figure 3:
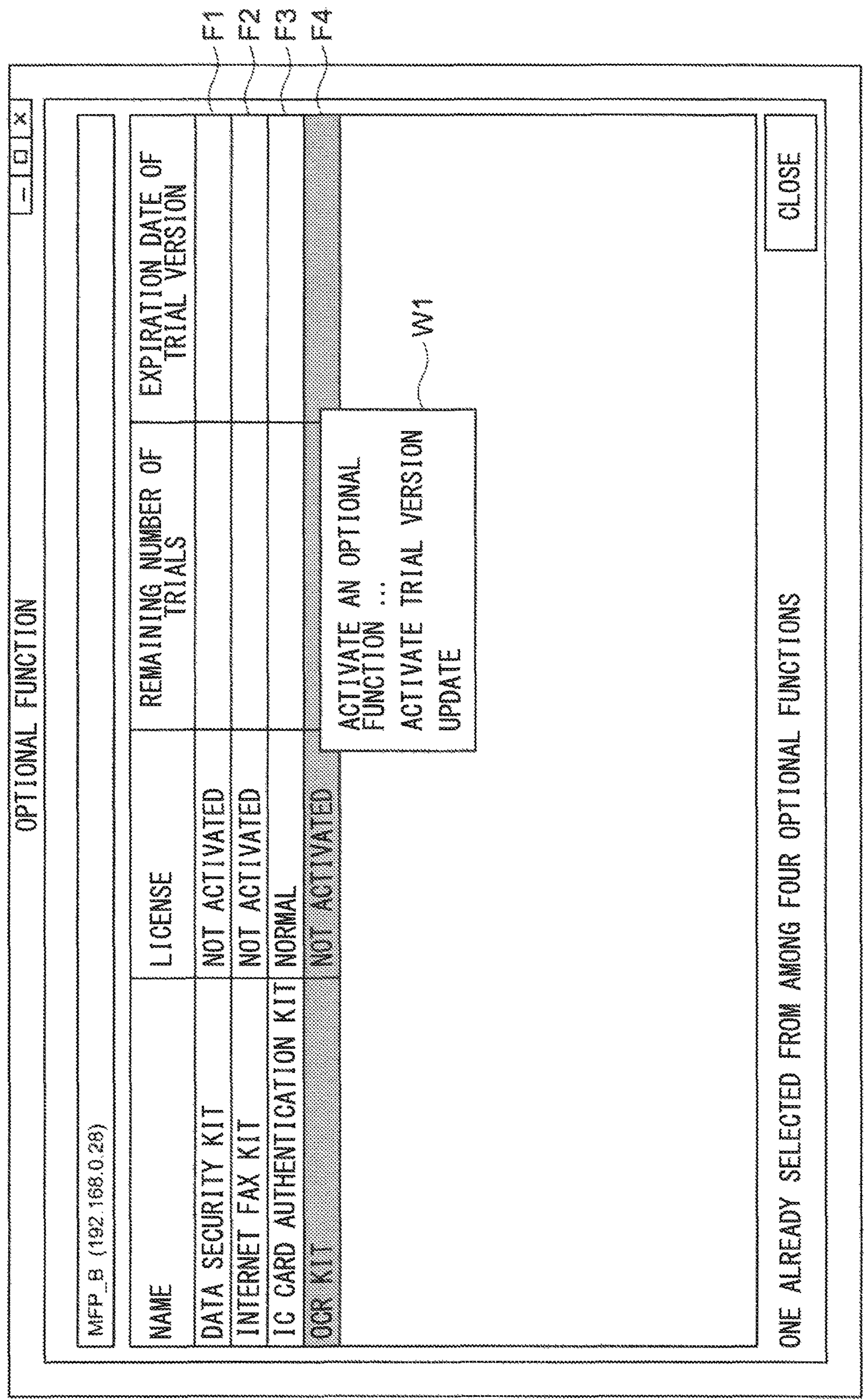
FIG. 3 is a diagram illustrating an example of the screen on which the administrator operates.

Upon completion of the selection of the MFP 20, a screen for selecting an optional function which is to be activated on the selected MFP 20 is next displayed as shown in FIG. 3. In this screen, 'OCR KIT', which is one of optional functions that can be activated on the device 'MFP_B', is selected so that the row F4 is highlighted.

When the administrator right-clicks the highlighted row F4 by mouse, a small window W1 is displayed. The administrator then selects 'ACTIVATING AN OPTIONAL FUNCTION . . . ' to give an instruction to activate the optional function 'OCR KIT' on the device 'MFP_B'.

Figure 4:
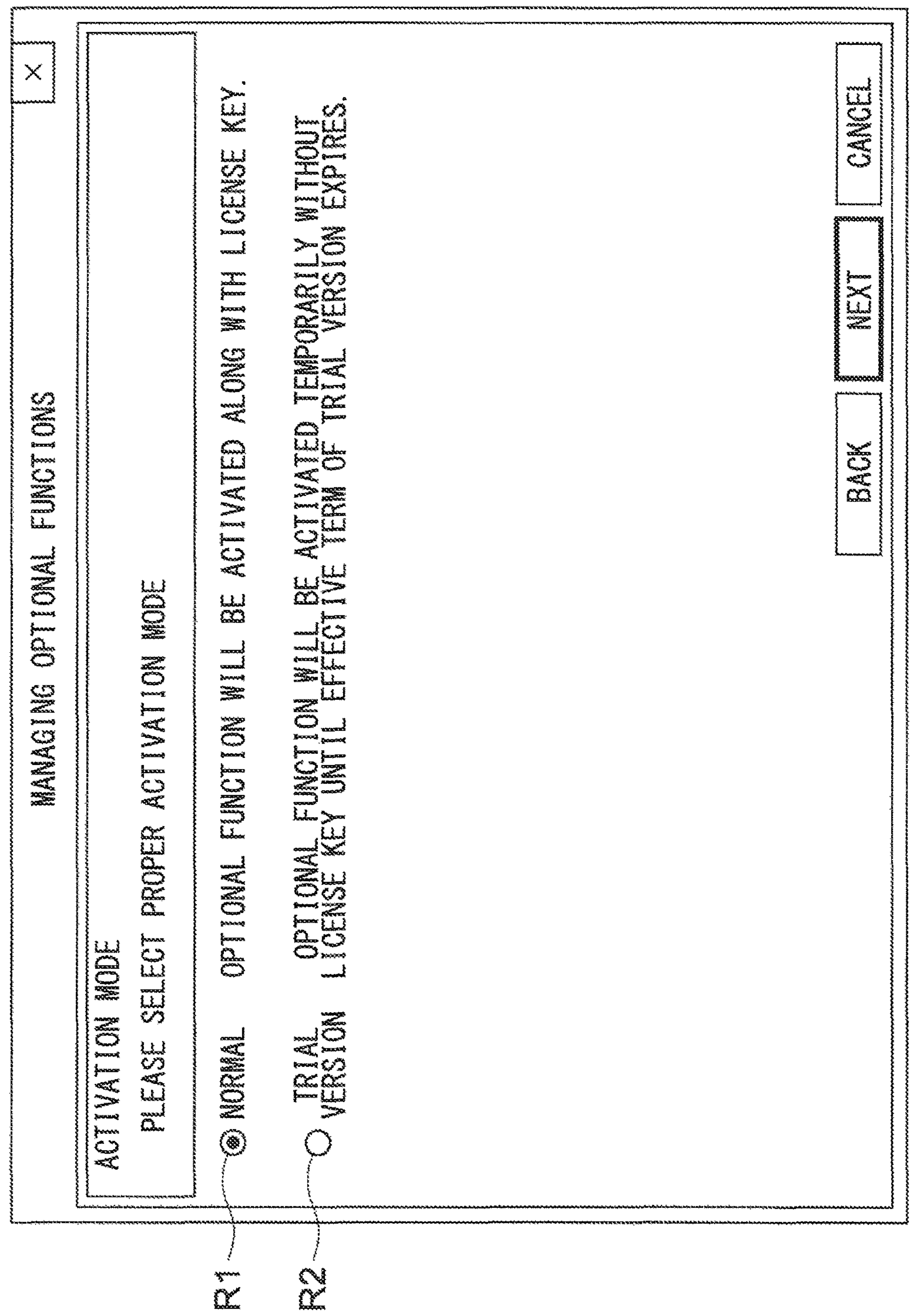
FIG. 4 is a diagram illustrating an example of the screen on which the administrator operates.

Next, as shown in FIG. 4, a screen for asking the administrator which mode the optional function is to be activated in is presented. The activation mode may be either a normal mode in which the optional function is activated with a normal license key acquired, or a trial version mode in which the optional function is activated without the license key only for a limited period.

In the case where the administrator has acquired the license key, selecting the normal radio button R1 causes the screen to be shifted to a license key input screen. In the license key input screen, as an example of display, the selected device 'MFP_B' is highlighted on the row G1 and an 'ADD LICENSE KEY . . . ' button B1 is displayed as shown in FIG. 5.

Next, with the optional function 'OCR KIT' selected on the 'MFP_B' as shown in FIG. 5, when the administrator presses the 'ADD LICENSE KEY . . . ' button B1, a window W2 for entering the license key is displayed.

When the administrator enters the license key in the window W2, the license key is inputted to the information processing device 10. With use of the inputted license key, the optional function 'OCR KIT' on the device 'MFP_B' is activated.

This is all of the description of an example of selecting one MFP 20 and then selecting and activating an optional function on the selected MFP 20.

(Example in Which a Plurality of MFPs are Selected)

Next, an example in which a plurality of MFPs 20 are selected and an optional function is selected and activated on the selected plurality of MFPs 20 will be described. FIGS. 6 to 8 are a screen example showing operations of selecting a plurality of MFPs 20 and then activating an optional function.

FIG. 6 shows an aspect in which a list of MFPs 20 is displayed by a counter view for selection of MFPs 20 on which an optional function is to be activated. In this case, rows E2 and E4, i.e., two devices 'MFP_B' and 'MFP_H' are selected.

Upon completion of the selection of the MFPs 20, a screen for selecting an optional function which is to be activated on the selected MFPs 20 is next displayed as shown in FIG. 7. In this screen, 'DATA SECURITY KIT', which is one of optional functions that can commonly be activated on the MFPs 20, is selected so that the row H1 is highlighted.

Next, after selection of the activation mode and with the optional function 'DATA SECURITY KIT' selected on the device 'MFP_B', when the administrator presses the 'ADD LICENSE KEY . . . ' button B1, a window W2 for entering the license key is displayed as shown in FIG. 8. In the screen example shown in FIG. 8, the selected devices 'MFP_B' and 'MFP_H' are displayed on the rows G1 and G2, respectively, and moreover the device 'MFP_B' on which the optional function is to be activated is highlighted in display.

By the administrator entering the license key in the window W2, the license key is inputted to the information processing device 10. With use of the inputted license key, the optional function 'DATA SECURITY KIT' on the device 'MFP_B' is activated.

Thereafter, input of a license key for the optional function 'DATA SECURITY KIT' on the device 'MFP_H' is also executed, by which the optional function is activated.

This is all of the description of an example of selecting a plurality of MFPs 20 and then selecting and activating an optional function on the selected plurality of MFPs 20.

(Input by CSV File)

Next, operations will be described on a case where the administrator acquires license keys by way of a CSV file from a manufacturer or dealer and has the acquired CSV file at hand.

FIG. 9 depicts a screen for an operation of inputting license keys into the information processing device 10 with use of a CSV file. It is noted that screens precedent to this screen are similar to FIGS. 6 and 7 and so their description is omitted.

FIG. 9 shows a state in which devices 'MFP_B' and 'MFP_H' have been selected as MFPs on which an optional function is to be activated and moreover 'DATA SECURITY KIT' has been selected as the optional function to be activated.

In this screen, pressing an 'IMPORT LICENSE KEYS . . . ' button B2 causes the OS (Operating System)-file operation screen to be opened. Then, by designating the stored CSV file in the file-operation screen, the administrator can enter the contents of the CSV file into the information processing device 10.

In addition, a CSV file has recorded license keys, as well as host names or IP addresses or the like, which are identifiers for uniquely identifying MFPs 20 respectively, on a combinational set basis.

This is all of the description of operations on a case where the administrator acquires license keys by way of a CSV file from a manufacturer or dealer and has the acquired CSV file at hand.

This is all of the description of operation examples by the administrator with the information processing device 10 with use of screen examples presented to the administrator.

Thus, using the information processing device 10 according to the embodiment of this disclosure makes it unnecessary for the administrator to go to installation places of the individual MFPs 20 to activate any optional function of the MFPs 20. Moreover, by acquiring a CSV file in which identifiers for uniquely identifying the MFPs 20 respectively as well as license keys or the like for activation of optional functions on the MFPs 20 respectively have been described on a combinational set basis, and by using the acquired CSV file, the administrator is enabled to collectively fulfill the activation of the optional functions on the MFPs 20, so that time and labor for the administrator can be reduced.

(Configuration)

Next, a configuration of the information processing device 10 will be described. The information processing device 10 may be implemented either by exclusive-use hardware or software or by a general computer. A configuration diagram in the case where the information processing device 10 is implemented by a general computer is shown in FIG. 10.

Figure 10:
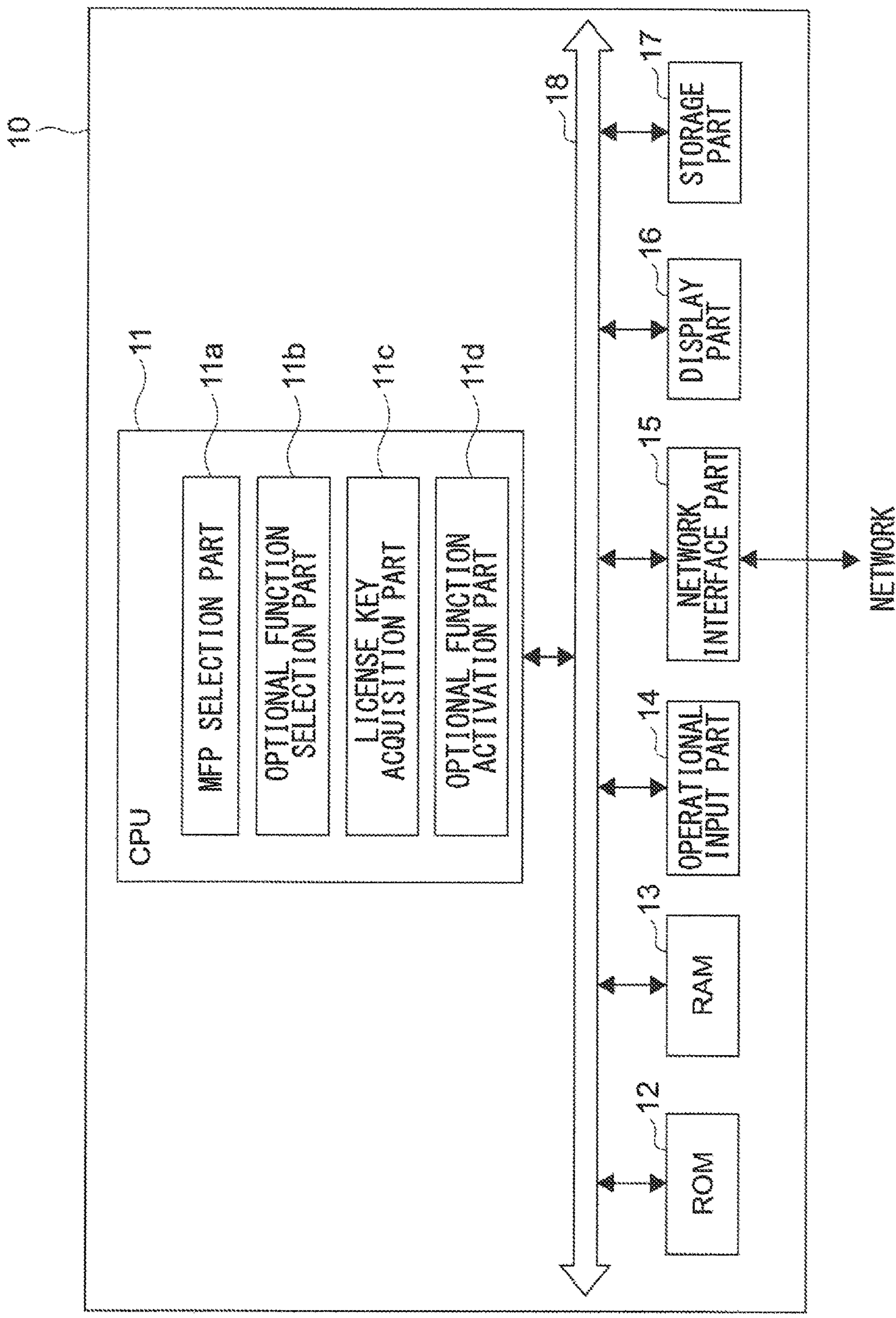
FIG. 10 is a diagram illustrating a functional block configuration of the information processing device 10.

As shown in FIG. 10, the information processing device 10 includes a CPU (Central Processing Unit) 11, a ROM (Read Only Memory) 12, a RAM (Random Access Memory) 13, an operational input part 14, a network interface part 15, a display part 16, and a storage part 17, where the individual parts or blocks are interconnected via a bus 18.

The ROM 12 stationarily stores a plurality of programs and data such as firmware for executing various types of processing. The RAM 13, which is used as a working area of the CPU 11, temporarily holds the OS, active various applications, and under-processing various data.

The storage part 17 is, for example, an HDD (Hard Disk Drive), flash memory or other nonvolatile memory. In the storage part 17, the OS, various applications and various data are stored.

The network interface part 15 is connected to a network for interchanging information with the external.

The CPU 11 develops on the RAM 13 a program corresponding to a command given from the operational input part 14, out of the plural programs stored in the ROM 12 or the storage part 17. According to this developed program, the CPU 11 controls the display part 16 and the storage part 17 as required.

The operational input part 14 is, for example, a mouse or other pointing device, a keyboard, a touch panel or other operation device.

The display part 16 is, for example, a liquid crystal display, an EL (Electro-Luminescence) display, a plasma display, a CRT (Cathode Ray Tube) display, or the like. The display part 16 may be either contained in the information processing device 10 or provided via external connection.

In addition, as shown in FIG. 10, the CPU 11 includes an MFP selection part 11*a* as an image forming apparatus selection part, an optional function selection part 11*b*, a license key acquisition part 11*c*, and an optional function activation part 11*d*. The MFP selection part 11*a*, the optional function selection part 11*b*, the license key acquisition part 11*c*, and the optional function activation part 11*d* are functional blocks which are implemented as programs loaded from the ROM 12 or the like to the RAM 13 are executed by the CPU 11.

The MFP selection part 11*a* presents to the administrator a list of MFPs 20 that make candidates for activation of an optional function, and accepts a selection of MFPs 20 by the administrator.

The optional function selection part 11*b* presents to the administrator a list of optional functions to be activated on the MFPs 20, and accepts a selection of optional functions by the administrator.

The license key acquisition part 11*c* accepts from the administrator a license key or the like to be used for activation of the optional function selected by the optional function selection part 11*b* in the MFP 20 selected by the MFP selection part 11*a*.

The optional function activation part 11*d*, with use of the license key or the like acquired from the administrator by the license key acquisition part 11*c*, activates the optional function selected by the optional function selection part 11*b* in the MFP 20 selected by the MFP selection part 11*a*.

This is all of the description of the configuration of the information processing device 10.

(Processing Flow)

Figure 11:
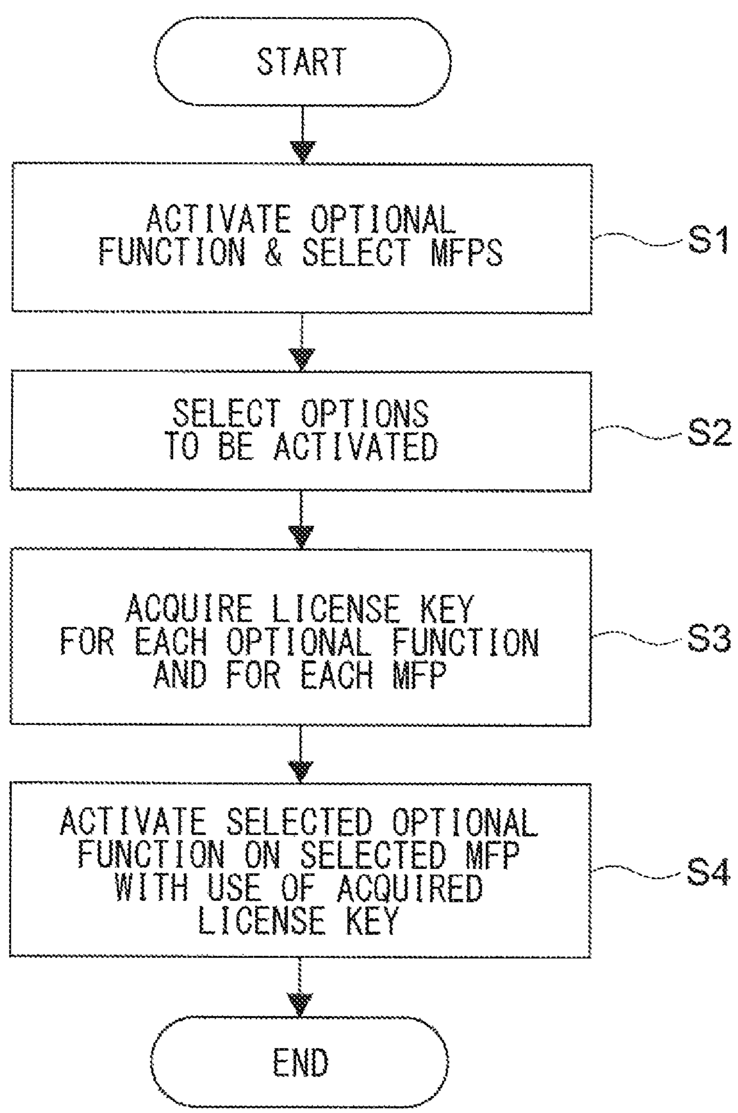
FIG. 11 is a flowchart of a processing flow in the information processing device 10.

Next, the processing flow in the information processing device 10 will be described. FIG. 11 is a flowchart of the processing flow in the information processing device 10.

First, the MFP selection part 11*a* presents to the administrator, via the display part 16, a list of MFPs 20 that make candidates for activation of the optional function. The MFP selection part 11*a* then accepts a selection by the administrator via the operational input part 14 (step S1).

Next, the optional function selection part 11*b* presents to the administrator, via the display part 16, a list of candidates for a optional function to be activated. The optional function selection part 11*b* then accepts a selection by the administrator via the operational input part 14 (step S2).

Next, the license key acquisition part 11*c* accepts, via the operational input part 14, a license key or the like for activation of the selected optional function on the selected MFP 20 (step S3).

Next, for activation of the selected optional function on the selected MFP 20, the optional function activation part 11*d* communicates with the selected MFP 20 by using the acquired license key or the like to issue an instruction for activation of the selected optional function (step S4).

This is all of the description of the processing flow in the information processing device 10.

(Supplementaries)

As described above, the information processing device 10 of this disclosure includes: a display part 16; an operational input part 14; an MFP (Multifunction Peripheral) selection part 11*a* for presenting to an administrator, via the display part 16, a list of MFP 20 candidates for activation of an optional function and then accepting a selection by the administrator via the operational input part 14; an optional function selection part 11*b* for presenting to the administrator, via the display part 16, a list of candidates for optional functions to be activated on the selected MFP 20 and then accepting a selection by the administrator via the operational input part 14; a license key acquisition part 11*c* for acquiring a license key or other like for activation of the selected optional function on the selected MFP 20; and an optional function activation part 11*d* for issuing to the selected MFP 20 an instruction for activating the selected optional function on the selected MFP 20 with use of the acquired license key or the like.

In addition, this disclosure is not limited only to the above-described embodiment and of course may be changed and modified in various ways unless those changes and modifications depart from the gist of the disclosure.

As described above, the information processing device 10 according to this embodiment includes the display part 16, the operational input part 14, the MFP selection part 11*a*, the optional function selection part 11*b*, the license key acquisition part 11*c*, and the optional function activation part 11*d*. Therefore, the information processing device 10 is enabled to reduce time and labor for inputting license-related data to validate optional functions of the MFP 20.

Also, the license key acquisition part 11*c* may acquire the license key or the like by way of a CSV file in which an identifier for uniquely identifying the selected MFP 20 as well as the license key or the like for activating the selected optional function on the selected MFP 20 are described on a combinational set basis.

Furthermore, this disclosure may be an information processing program for making a computer operate as the MFP selection part 11*a*, the optional function selection part 11*b*, the license key acquisition part 11*c*, and the optional function activation part 11*d*, as well as may be a nontemporary computer-readable recording medium for storing information processing programs or an information processing method for use of the information processing device having the above-described configuration.

As described hereinabove, according to this disclosure, time and labor for inputting license-related data to validate optional functions of an MFP can be reduced.

What is claimed is:

1. An image forming system comprising:

an information processing device connected to a network; and a plurality of image forming apparatuses connected each other via the network, the information processing device including:

a display device that includes one of a liquid crystal display, an Electro-Luminescence (EL) display, a plasma display, a Cathode Ray Tube (CRT) display;

an operational input device that includes one of a mouse, a keyboard, and a touch panel; and a Central Processing Unit (CPU) that functions as an image forming apparatus selection part, an optional function selection part, a license key acquisition part, and an optional function activation part, wherein:

the CPU as the image forming apparatus selection part i) presents a first screen to an administrator on the display device, the first screen displaying a list of the plurality of image forming apparatuses for activation of an optional function, and ii) then accepts a selection of one or more among the plurality of image forming apparatuses by the administrator via the operational input device;

the CPU as the optional function selection part i) presents a second screen to the administrator on the display device, the second screen displaying a list of a plurality of optional functions to be activated on selected image forming apparatuses, and ii) then accepts a selection of one of the plurality of optional functions by the administrator via the operational input device;

the CPU as the license key acquisition part acquires license keys for activation of the selected one of the plurality of optional function on the selected image forming apparatuses; and the CPU as the optional function activation part that issues to the selected image forming apparatuses an instruction for activating the selected one of the plurality of optional functions on the selected image forming apparatuses with use of the acquired license keys, wherein the CPU as the license key acquisition part:

presents a third screen to the administrator on the display device, the third screen displaying i) the selected image forming apparatuses, ii) the selected one of the plurality of optional functions on the selected image forming apparatuses, and iii) a button for importing a license key; and acquires, when the button for importing the license key causes an Operating System (OS)-file operation screen to be opened, a CSV file by designating the stored CSV file in the OS-file operation screen, and wherein the CSV file has recorded the license keys, and at least one of host names and IP addresses, which are identifiers for uniquely identifying the plurality of image forming apparatuses respectively, on a combinational set basis.

2. An activation method of an optional function by an image forming system including an information processing device connected to a network, and a plurality of image forming apparatuses connected each other via the network, comprising:

via the information processing device, presenting a first screen to an administrator, the first screen displaying a list of the plurality of image forming apparatuses for activation of the optional function;

accepting a selection of one or more among the plurality of image forming apparatuses by the administrator;

presenting a second screen to the administrator, the second screen displaying a list of a plurality of optional functions to be activated on the selected image forming apparatuses;

accepting a selection of one of the plurality of optional functions by the administrator;

acquiring license keys for activation of the selected one of the plurality of optional functions on the selected image forming apparatuses; and issuing to the selected image forming apparatuses an instruction for activating the selected one of the plurality of optional functions on the selected image forming apparatuses with use of the acquired license keys, wherein the method further includes:

via the information processing device, presenting a third screen to the administrator on the display device, the third screen displaying i) the selected image forming apparatuses, ii) the selected one of the plurality of optional functions on the selected image forming apparatuses, and iii) a button for importing a license key; and acquiring, when the button for importing the license key causes an Operating System (OS)-file operation screen to be opened, a CSV file by designating the stored CSV file in the OS-file operation screen, and wherein the CSV file has recorded the license keys, and at least one of host names and IP addresses, which are identifiers for uniquely identifying the plurality of image forming apparatuses respectively, on a combinational set basis.

* * * * *